(12) United States Patent
Zhao et al.

(10) Patent No.: US 11,146,069 B2
(45) Date of Patent: Oct. 12, 2021

(54) OPTIMIZED CONTROL METHOD FOR PRIMARY FREQUENCY REGULATION BASED ON EXERGY STORAGE CORRECTION OF THERMODYNAMIC SYSTEM OF COAL-FIRED UNIT

(71) Applicant: XI'AN JIAOTONG UNIVERSITY, Shaanxi (CN)

(72) Inventors: Yongliang Zhao, Shaanxi (CN); Junjie Yan, Shaanxi (CN); Ming Liu, Shaanxi (CN); Daotong Chong, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 13 days.

(21) Appl. No.: 16/753,328

(22) PCT Filed: Jun. 22, 2019

(86) PCT No.: PCT/CN2019/092430
§ 371 (c)(1),
(2) Date: Apr. 2, 2020

(87) PCT Pub. No.: WO2020/181678
PCT Pub. Date: Sep. 17, 2020

(65) Prior Publication Data
US 2021/0218247 A1    Jul. 15, 2021

(30) Foreign Application Priority Data
Mar. 13, 2019    (CN) .......................... 201910189043.1

(51) Int. Cl.
*G05B 19/41*    (2006.01)
*H02J 3/24*    (2006.01)
(Continued)

(52) U.S. Cl.
CPC ............ *H02J 3/24* (2013.01); *G05B 19/4155* (2013.01); *H02J 13/00002* (2020.01); *G05B 2219/49219* (2013.01)

(58) Field of Classification Search
None
See application file for complete search history.

(56) References Cited

U.S. PATENT DOCUMENTS

| 2004/0020206 A1* | 2/2004 | Sullivan ................ F01K 23/101 60/670 |
| 2008/0147241 A1* | 6/2008 | Tsangaris ............... C10K 1/101 700/273 |

(Continued)

FOREIGN PATENT DOCUMENTS

| CN | 105275508 A | 1/2016 |
| CN | 105826936 A | 8/2016 |
| CN | 106527131 A | 3/2017 |

OTHER PUBLICATIONS

Gao et al., "Investigation on energy storage and quick load change control of subcritical circulating fluidized bed boiler units", Aug. 1, 2016, Applied Energy 185 (2017) 463-471. (Year: 2016).*

(Continued)

*Primary Examiner* — Mohammad Ali
*Assistant Examiner* — Kelvin Booker

(57) ABSTRACT

An optimized control method for a primary frequency regulation based on art exergy storage correction of a thermodynamic system of a coal-fired unit is provided. Through measuring and recording temperatures and pressures of working fluids and metal heating surfaces of the coal-fired unit thermodynamic system in real-time, an exergy storage amount of the thermodynamic system is obtained. During a transient process, according to an exergy storage variation before and after acting of each regulation scheme, a maximum power output of each scheme is (Continued)

obtained. Thereafter, through comparing the maximum power output with a power regulation quantity required by a power grid, an optimal primary frequency regulation control scheme is selected, so as to maintain a fast and stable grid frequency. The present invention reduces a selection blindness of the primary frequency regulation schemes, so that an operation flexibility of the coal-fired power unit during the transient processes is greatly improved.

5 Claims, 2 Drawing Sheets

(51) Int. Cl.
 G05B 19/4155 (2006.01)
 H02J 13/00 (2006.01)

(56) References Cited

U.S. PATENT DOCUMENTS

| | | | | |
|---|---|---|---|---|
| 2008/0209807 | A1* | 9/2008 | Tsangaris | C10K 1/16 48/89 |
| 2010/0326075 | A1* | 12/2010 | Fong | F01K 27/00 60/650 |
| 2011/0036014 | A1* | 2/2011 | Tsangaris | C10J 3/482 48/62 R |
| 2012/0245753 | A1* | 9/2012 | Forbes, Jr. | H02J 3/14 700/295 |
| 2014/0018969 | A1* | 1/2014 | Forbes, Jr. | H02J 3/32 700/295 |
| 2014/0332724 | A1* | 11/2014 | Tsangaris | C10J 3/726 252/373 |
| 2015/0040848 | A1* | 2/2015 | McAlister | F02B 47/04 123/1 A |
| 2016/0370819 | A1* | 12/2016 | Forbes, Jr. | G05B 17/02 |
| 2017/0090548 | A1* | 3/2017 | Cheng | G06F 1/3287 |
| 2020/0271311 | A1* | 8/2020 | Janvier | F23G 5/50 |

OTHER PUBLICATIONS

Kubik et al., "Increasing thermal plant flexibility in a high renewables power system", Sep. 25, 2014, Applied Energy 154 {2015} 102-111. (Year: 2014).*

Llic et al., "Experimental investigations of flow distribution in coolant system ofHelium-Cooled-Pebble-Bed Test Blanket Module", Jul. 30, 2015, Fusion Engineering and Design 103 (2016) 53-68. (Year: 2015).*

Long et al., "An experiment-based model of condensate throttling and its utilization in load control of 1000 MW power units", Nov. 9, 2016, Energy 133 (2017) 941e954. (Year: 2016).*

Henrique et al., "Criticality-based maintenance of a coal-fired power plant", Aug. 2, 2017, Energy 147 (2018) 767e781. (Year: 2017).*

Stevanovic et al., "Primary control reserve of electric power by feedwater flow rate change through an additional economizer—A case study of the thermal power plant "Nikola Tesla B"", Feb. 1, 2018, Energy 147 (2018) 782e798. (Year: 2018).*

Wang et al., "A mathematical model suitable for simulation of fast cut back of coal-fired boiler-turbine plant", May 5, 2016, Applied Thermal Engineering 108 (2016) 546-554. (Year: 2016).*

Wang et al., "Dynamic modeling and operation optimization for the cold end system of thermal power plants during transient processes", Dec. 29, 2017, Energy 145 (2018) 734-746. (Year: 2017).*

Wang et al., "Thermodynamic analysis on the transient cycling of coal-fired power plants: Simulation study of a 660 MW supercritical unit", Oct. 10, 2016, Energy 122(2017)505-527. (Year: 2016).*

Wang et al., "An improved coordinated control strategy for boiler-turbine units supplemented by cold source flow adjustment", Feb. 4, 2015, Energy 88 (2015) 927e934. (Year: 2015).*

Wang et al., "Peak shaving operational optimization of supercritical coal-fired power plants by revising control strategy for water-fuel ratio", Aug. 12, 2017, Applied Energy 216 (2018) 212-223. (Year: 2017).*

Zhao et al, "Exergy analysis of the regulating measures of operational flexibility in supercritical coal-fired power plants during transient processes", Jan. 15, 2019, Applied Energy 253 (2019) 113487. (Year: 2019).*

Zhao et al., "Increasing operational flexibility of supercritical coal-fired power plants by regulating thermal system configuration during transient processes", Apr. 18, 2018, Applied Energy 228 (2018) 2375-2386. (Year: 2018).*

Zhao et al., "Improvement of fuel sources and energy products flexibility in coal power plants via energy-cyber-physical-systems approach", Jan. 31, 2019, Applied Energy 254 (2019) 11 3554. (Year: 2019).*

Zhao et al., "Improving operational flexibility by regulating extraction steam of high pressure heaters on a 660MW supercritical coal-fired power plant: A dynamic simulation", Jul. 25, 2017, Applied Energy 212 (2018) 1295-1309. (Year: 2017).*

Xu et al., "Dynamic modeling and solution algorithm of the evaporation system for the ultra-supercritical power plant", May 10, 2016, International Journal of Heat and Mass Transfer 105 (2017) 589-596. (Year: 2016).*

Zhao et al., "Fatigue Lifetime Estimation of a Heater in Coal-Fired Power Plants Under a Flexible Operational Framework—Regulating Extraction Steam of High-Pressure Heaters", Aug. 2018, 10th International Conference on Applied Energy (ICAE2018), Aug. 22-25, 2018, Hong Kong, China. (Year: 2018).*

Wang et al., "Improved boiler-turbine coordinated control of 1000 MW power units by introducing condensate throttling", Dec. 16, 2015, Journal of Process Control 50 (2017) 11-18. (Year: 2015).*

Wang et al., "Enhancing peak shaving capability by optimizing reheat-steam temperature control of a double-reheat boiler", Mar. 27, 2019, Applied Energy 260 (2020) 114341. (Year: 2019).*

Hu et al., "Dynamic model for controller design of condensate throttling systems", Jun. 16, 2014, ISA Transactions58(2015)622-628. (Year: 2014).*

Angerer et al., "Transient simulation and fatigue evaluation of fast gas turbine startups and shutdowns in a combined cycle plant with an innovative thermal buffer storage", Nov. 21, 2016, Energy 130 (2017) 246e257. (Year: 2016).*

* cited by examiner

OPTIMIZED CONTROL METHOD FOR PRIMARY FREQUENCY REGULATION BASED ON EXERGY STORAGE CORRECTION OF THERMODYNAMIC SYSTEM OF COAL-FIRED UNIT

CROSS REFERENCE OF RELATED APPLICATION

This is a U.S. National Stage under 35 U.S.C 371 of the International Application PCT/CN2019/092430, filed Jun. 22, 2019, which claims priority under 35 U.S.C. 119(a-d) to CN 201910189043.1, filed Mar. 13, 2019.

BACKGROUND OF THE PRESENT INVENTION

Field of Invention

The present invention relates to a technical field of thermal control of thermal power plants, and more particularly to an optimized control method for a primary frequency regulation based on an exergy storage correction of a thermodynamic system of a coal-fired unit.

Description of Related Arts

With the problems, such as energy shortage, environmental pollution and climatic change, becoming increasingly prominent, the renewable energy source utilization of various countries is increased year by year. However, most of the renewable energy sources have the features of intermittency and the fluctuation, and are easily influenced by the environmental conditions, which causes the great impact to the safety stability of the electric power system, so that it is necessary to increase the grid flexibility. The short-term grid regulation mainly refers to the primary frequency regulation; that is to say, under the conditions that the load frequently changing in the small range is adjusted and the grid accident happens, the output of the power unit is rapidly adjusted, so as to inhibit the further deterioration of the grid frequency. Because of the advantages of large volume, controllable power, no geographical restriction of the coal-fired power unit, the coal-fired power unit has been widely applied in the operation flexibility adjustment of the grid. From the coal-fired unit itself, any method able to rapidly release the thermal storage of the unit and convert into the output power can be adopted as the means of the primary frequency regulation. The conventional regulation schemes comprise a live steam valve regulation scheme, a high-pressure heater extraction steam regulation scheme, a low-pressure heater extraction steam regulation scheme, a cooling water regulation scheme, a heating network energy storage regulation scheme, etc. However, because the unit itself is in the transient operation processes, if directly selecting the regulation scheme according to the steady-state regulation ability, it easily causes the insufficient regulation ability, and is unable to realize the automatic control. Thus, from the essence of the operating characteristics of the transient processes, the strategy and data guidance are provided for the primary frequency regulation control of the coal-fired unit, so as to fundamentally improve the operational flexibility of the coal-fired power unit.

SUMMARY OF THE PRESENT INVENTION

An object of the present invention is to provide an optimized control method for a primary frequency regulation based on an exergy storage correction of a thermodynamic system of a coal-fired unit, so as to solve problems that various thermodynamic system regulation schemes of the coal-fired unit during transient processes are unable to be accurately and automatically involved in primary frequency regulation control. According to an exergy storage variation before and after acting of each thermodynamic system regulation scheme, the method provided by the present invention is able to accurately judge a regulation ability and an economy of each regulation scheme, so as to effectively select a reasonable scheme to be involved in the primary frequency regulation during the transient processes, and rapidly and effectively ensure a stability of a grid frequency.

In order to solve the above technical problems, the present invention adopts technical solutions as follows.

An optimized control method for a primary frequency regulation based on an exergy storage correction of a thermodynamic system of a coal-fired unit is provided, which determines an optimal primary frequency regulation control scheme suitable for a current state according to an exergy storage amount of each thermodynamic device of the thermodynamic system of the coal-fired unit during different transient processes, and corrects a primary frequency regulation control logic, comprising steps of:

(1) acquiring a real-time exergy storage amount of each thermodynamic device of the thermodynamic system of the coal-fired unit, particularly comprising steps of:

through pressure sensors, acquiring pressures of working fluids of each thermodynamic device of the thermodynamic system of the coal-fired unit; through temperature sensors, acquiring temperatures of the working fluids and metal heating surfaces of each thermodynamic device of the thermodynamic system of the coal-fired unit; looking up a calculation table of water and steam properties, and calculating the exergy storage amount of each thermodynamic device in arbitrary states, comprising exergy storage amounts of the working fluids and the metal heating surfaces; wherein: for an $i^{th}$ thermodynamic device, an exergy storage amount is calculated through formulas of:

$$Ex_{s,i} = M_s \cdot [u(P_{s,i}, T_{s,i}) - u_0 - T_0 \cdot (s(P_{s,i}, T_{s,i}) - s_0)];$$

$$Ex_{m,i} = M_m \cdot C_m [T_{m,i} - T_0 - T_0 \cdot \ln(T_{m,i}/T_0)];$$

$$Ex_{w,i} = M_w \cdot [u(P_{w,i}, T_{w,i}) - u_0 - T_0 \cdot (s(P_{w,i}, T_{w,i}) - s_0)];$$

$$Ex_i = Ex_{s,i} + Ex_{m,i} + Ex_{w,i};$$

in the formulas: $Ex_{s,i}$, $Ex_{m,i}$ and $Ex_{w,i}$ are respectively exergy storage amounts of steam, metal heating surfaces and feed water of the $i^{th}$ thermodynamic device, in unit of kJ; $M_s$; $M_m$ and $M_w$ are respectively mass of steam, metal heating surfaces and feed water of the $i^{th}$ thermodynamic device, in unit of kg; $T_0$ is an ambient temperature, in unit of K; $u_0$ is a corresponding internal energy under the ambient temperature and an ambient pressure, in unit of kJ/kg; $s_0$ is a corresponding entropy under the ambient temperature and the ambient pressure, in unit of kJ/(kg·K); $u(P_{s,i}, T_{s,i})$ is an internal energy of steam, which is calculated through a steam pressure $P_{s,i}$ and a steam temperature $T_{s,i}$, in unit of kJ/kg; $s(P_{s,i}, T_{s,i})$ is an entropy of steam, which is calculated through the steam pressure and the steam temperature $T_{s,i}$, in unit of kJ/(kg·K), $C_m$ is a specific heat capacity of metal heating surfaces of a heater, in unit of kJ/(kg·K); $T_{m,i}$ is an average temperature of the metal heating surfaces of the heater, in unit of K; $u(P_{w,i}, T_{w,i})$ is an internal energy of feed water, which is calculated through a feed water pressure $P_{w,i}$ and a feed water temperature $T_{w,i}$, in unit of kJ/kg; $s(P_{w,i},$ $T_{w,i}$) is an entropy of feed water, which is calculated through the feed water pressure $P_{w,i}$ and the feed water temperature $T_{w,i}$ in unit of kJ/(kg·K);

(2) acquiring a maximum power output of various regulation schemes of the thermodynamic system of the coal-fired unit, wherein: the various regulation schemes of the thermodynamic system of the coal-fired unit for the primary frequency regulation comprises a high-pressure heater extraction steam throttling scheme, a high-pressure heater feed water bypass scheme; a low-pressure heater extraction steam throttling scheme and a low-pressure heater condensation water throttling scheme; during a transient operation process; an exergy storage amount of each regulation scheme involved in the primary frequency regulation in an initial state is a total exergy storage amount of all thermodynamic devices of a corresponding subsystem;

in the initial state, a total exergy storage amount Ex of a subsystem corresponding to a $j^{th}$ thermodynamic system regulation scheme is $$Ex_{j,a} = \sum_{i=1}^{N} Ex_{j,i,a},$$

wherein j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $$Ex_{j,a} = \sum_{i=1}^{N} Ex_{j,i,a}, Ex_{j,i,a}$$

is an exergy storage amount of an $i^{th}$ thermodynamic device of the subsystem corresponding to the $j^{th}$ thermodynamic system regulation scheme, in unit of kJ; N is a total number of all thermodynamic devices included in the subsystem corresponding to the $j^{th}$ thermodynamic system regulation scheme;

in the different thermodynamic system regulation schemes, temperature values and pressure values of each thermodynamic device at the end of the primary frequency regulation are obtained according to principles as follows;

for the high-pressure heater extraction steam throttling scheme, namely j=1, at the end of the primary frequency regulation, inside each high-pressure heater, a steam pressure is a drain pressure at an inlet of a deaerator, a steam temperature is a temperature of saturated steam corresponding to the drain pressure at the inlet of the deaerator, a feed water temperature is a temperature at an outlet of a feed water pump, a feed water pressure is a pressure at the outlet of the feed water pump, and a temperature of the metal heating surfaces is same to the steam temperature;

for the high-pressure heater feed water bypass scheme, namely j=2, at the end of the primary frequency regulation, inside each high-pressure heater, a steam pressure is a pressure at a corresponding extraction steam outlet, a steam temperature is a temperature of saturated steam corresponding to the pressure at the corresponding extraction steam outlet, a feed water temperature is a temperature at an outlet of a feed water pump, a feed water pressure is a pressure at the outlet of the feed water pump, and a temperature of the metal heating surfaces is same to the steam temperature;

for the low-pressure heater extraction steam throttling scheme, namely j=3, at the end of the primary frequency regulation, inside each low-pressure heater, a steam pressure is a drain pressure at an inlet of a condenser, a steam temperature is a temperature of saturated steam corresponding to the drain pressure at the inlet of the condenser, a temperature of condensation water is a temperature at an outlet of a condensation water pump, a pressure of condensation water is a pressure at the outlet of the condensation water pump, and a temperature of the metal heating surfaces is same to the steam temperature;

for the low-pressure heater condensation water throttling scheme, namely j=4, at the end of the primary frequency regulation, inside each low-pressure heater, a steam pressure is a pressure at a corresponding extraction steam outlet, a steam temperature is a temperature of saturated steam corresponding to the pressure at the corresponding extraction steam outlet, a temperature of condensation water is a temperature at an outlet of a condensation water pump, a pressure of condensation water is a pressure at the outlet of the condensation water pump, and a temperature of the metal heating surfaces is same to the steam temperature;

thereafter, an obtained total exergy storage amount $Ex_{j,b}$ of the corresponding subsystem after acting of the $j^{th}$ thermodynamic system regulation scheme is $$Ex_{j,b} = \sum_{i=1}^{N} Ex_{j,i,b},$$

wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $$Ex_{j,b} = \sum_{i=1}^{N} Ex_{j,i,b}, Ex_{j,i,b}$$

is an exergy storage amount of the $i^{th}$ thermodynamic device of the subsystem corresponding to the $j^{th}$ thermodynamic system regulation scheme in an end state, in unit of kJ; N is the total number of all the thermodynamic devices included in the subsystem corresponding to the $j^{th}$ thermodynamic system regulation scheme;

therefore, an exergy storage variation $\Delta Ex_j$ under acting of the $j^{th}$ thermodynamic system regulation scheme is $\Delta Ex_j=|Ex_{j,a}-Ex_{j,b}|$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

an average exergy storage variation rate $\Delta \dot{E}x_j$ under acting of the $j^{th}$ thermodynamic system regulation scheme is $\Delta \dot{E}x_j=\Delta Ex_j/T_j$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $\Delta \dot{E}x_j=\Delta Ex_j/T_j$, $T_j$ is time required by the primary frequency regulation; and according to grid assessment requirements, $T_j$ takes 60 seconds;

a one-to-one correspondence exists between the average exergy storage variation rate and the maximum power output of the $j^{th}$ thermodynamic system regulation scheme that:

$\Delta P_j = \Delta \dot{E}x_j \cdot \eta_j$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $\Delta P_j = \Delta \dot{E}x_j \cdot \eta_j$, $\Delta P_j$ is the maximum power output of the $j^{th}$ thermodynamic system regulation scheme, in unit of kW; $\Delta Ex_j$ is the average exergy storage variation rate under acting of the thermodynamic system regulation scheme, in unit of kW; $\eta_j$ is an exergy storage conversion efficiency of the $j^{th}$ thermodynamic system regulation scheme;

(3) generating an optimal primary frequency regulation cot scheme suitable for a current operation state, particularly comprising steps of:

according to a grid frequency deviation $\Delta f$ of the current state and a current speed droop $\delta$ of the coal-fired unit, acquiring a maximum power regulation quantity $\Delta P$ required by a current frequency regulation through a formula of:

$\Delta P = f_1(\Delta f) = \Delta f/\delta;$ comparing the maximum power output $\Delta P_j$ under acting of the four regulation schemes with the maximum power regulation quantity $\Delta P$ required by the current frequency regulation, and judging whether it meets a condition of:

$\Delta P_j \geq \Delta P$, wherein $j$ is selected from 1,2,3 and 4;

in the regulation schemes meeting the condition of $\Delta P_j \geq \Delta P$, generating the optimal primary frequency regulation control scheme k suitable for the current state, wherein a corresponding exergy storage conversion efficiency $\eta_k$ should take a maximum value of the exergy storage conversion efficiencies of the four thermodynamic system regulation schemes; that is to say, $\eta_k$ meets a condition of:

$\eta_k = \max\{\eta_1, \eta_2, \eta_3, \eta_4\};$ (4) generating a primary frequency regulation control logic corresponding to the optimal primary frequency regulation control scheme, particularly comprising steps of:

putting the determined optimal primary frequency regulation control scheme into a current primary frequency regulation control logic, wherein: the high-pressure heater extraction steam throttling scheme is to make an extraction steam pipe valve of each high-pressure heater involved in the primary frequency regulation control; the high-pressure heater feed water bypass scheme is to make a bypass pipe valve of each high-pressure heater involved in the primary frequency regulation control; the low-pressure heater extraction steam throttling scheme is to make an extraction steam pipe valve of each low-pressure heater involved in the primary frequency regulation control; and the low-pressure heater condensation water throttling scheme is to make a pipe valve of each low-pressure heater involved in the primary frequency regulation control;

then, superimposing a regulation output $\Delta \mu_{PID}$ obtained by a frequency difference of the primary frequency regulation in a PID (Proportion Integration Differentiation) controller to a corresponding control valve of the optimal scheme, and generating a new opening degree $\mu_{new}$ of the valve through a formula of:

$\mu_{new} = \mu_{old} + \Delta \mu_{PID}$, wherein: in the formula, $\mu_{old}$ is a corresponding valve opening degree in the initial state;

finally, forming a closed-loop optimized control logic for putting the optimal primary frequency regulation control scheme into the primary frequency regulation.

Preferably, in the four thermodynamic system regulation schemes, the high-pressure heater extraction steam throttling scheme and the high-pressure heater feed water bypass scheme utilize an exergy storage of a high-pressure heater subsystem in the primary frequency regulation, wherein the high-pressure heater subsystem comprises all of high-pressure heaters, high-pressure cylinders, medium-pressure cylinders and connection pipes; the low-pressure heater extraction steam throttling scheme and the low-pressure heater condensation water throttling scheme utilize an exergy storage of a low-pressure heater subsystem in the primary frequency regulation, wherein the low-pressure heater subsystem comprises all of low-pressure heaters, low-pressure cylinders, deaerators and connection pipes.

Preferably, in the high-pressure heater extraction steam throttling scheme and the low-pressure heater extraction steam throttling scheme, an electric control valve is adopted for each extraction steam pipe; in the high-pressure heater teed water bypass scheme and the low-pressure heater condensation water throttling scheme, a pneumatic control valve is adopted for each heater pipe.

Preferably, values of the exergy storage conversion efficiencies $T_{if}$ of the various thermodynamic system regulation schemes are listed as follows:

| | High-pressure heater extraction steam throttling scheme j = 1 | High-pressure heater feed water bypass scheme j = 2 | Low-pressure heater extraction steam throttling scheme j = 3 | Low-pressure heater condensation water throttling scheme j = 4 |
|---|---|---|---|---|
| $\eta_j$ | 72%~76% | 43%~55% | 81~89% | 23~28% |

Preferably, the speed droop $\delta$ suitable for the various thermodynamic system regulation schemes is 1%-4%.

Compared with the prior art, the present invention has advantages as follows.

Firstly, from the essential reason of the power response, the present invention dynamically tracks the exergy storage variation of each thermodynamic device of the thermodynamic system of the coal-fired unit, which improves a predictive accuracy of the actual effect of the various thermodynamic system regulation schemes and is suitable for the primary frequency regulation control during different transient processes, so that the operation flexibility of the coal-fired power unit during the transient processes is greatly improved.

Secondly, the present invention realizes automatic control, is easy to operate, and has a low investment.

DETAILED DESCRIPTION OF THE PREFERRED EMBODIMENT

The present invention is further illustrated with the accompanying drawings and the preferred embodiment.

Figure 1:
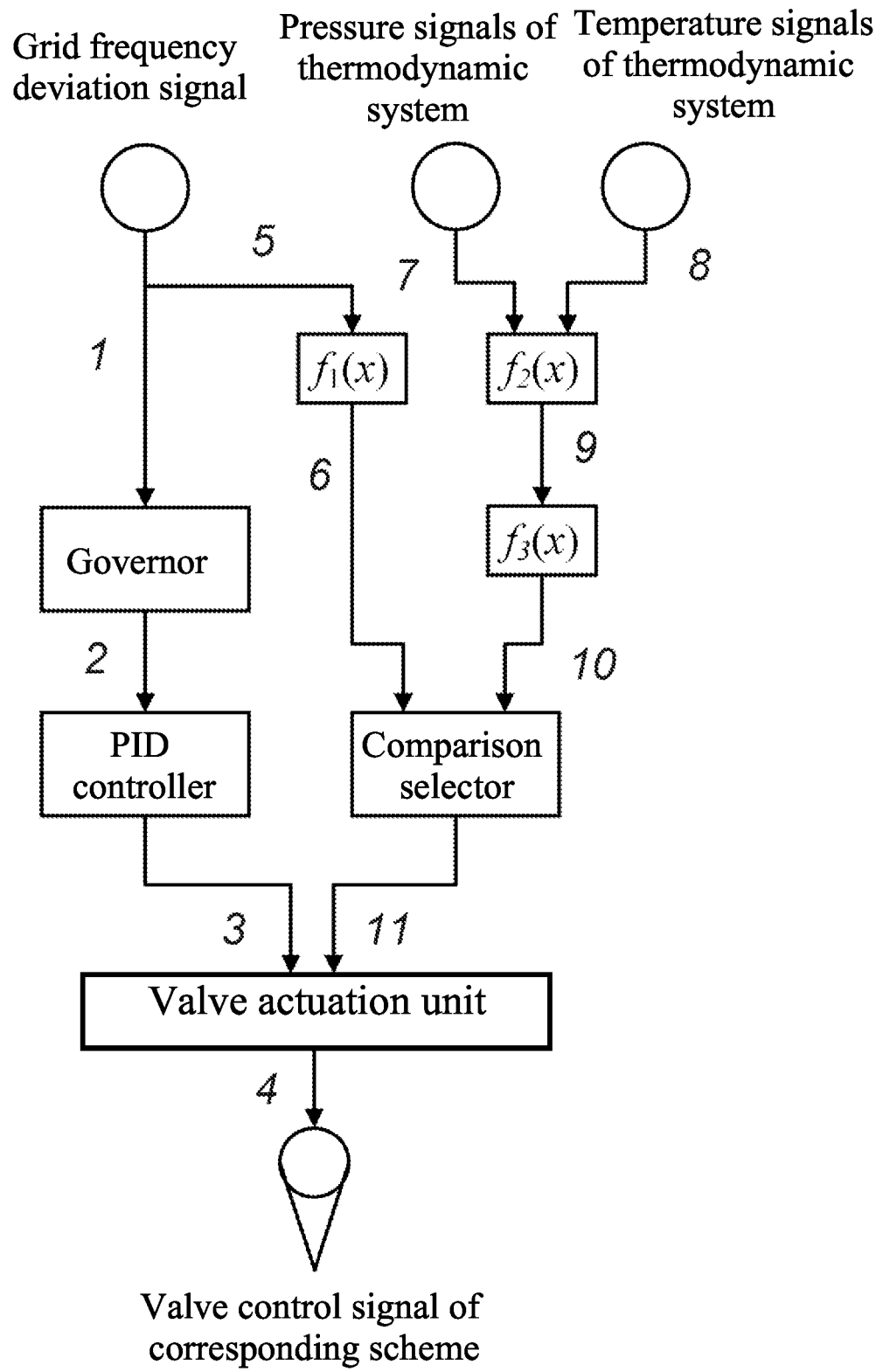
FIG. 1 is a control logic diagram of various thermodynamic system regulation schemes involved in a primary frequency regulation according to the present invention.

When a coal-fired unit is put into operation for a primary frequency regulation, as shown in FIG. 1, a conventional basic control logic is that: in a process of "1", a grid frequency deviation signal is detected by a measurement device and processed with digital-to-analog conversion, and then the processed signal is transmitted to a governor; in a process of "2", the governor converts the frequency signal into a power regulation signal (comprising setting of parameters such as frequency regulation dead band and speed droop), and transmits the signal to a PID (Proportion Integration Differentiation) controller; in a process of "3", the PID controller converts the inputted deviation signal into a valve regulation signal, and transmits to a valve actuation unit; in a process of "4", the valve actuation unit generates a valve displacement variation signal, which acts on a corresponding valve.

As shown in FIG. 1, the present invention introduces the new control logic that: in a process of "5", the grid frequency deviation signal is transmitted to a first processing unit $f_1(x)$; in a process of "6", the first processing unit $f_1(x)$ converts a maximum frequency signal to a maximum power regulation quantity signal, and transmits to a comparison selector; in a process of "7", pressure signals measured by pressure sensors of the thermodynamic system are transmitted to a second processing unit $f_2(x)$; in a process of "8", temperature signals measured by temperature sensors of the thermodynamic system are transmitted to the second processing unit $f_2(x)$; in a process of "9", in the second processing unit $f_2(x)$, according to temperature and pressure data of the thermodynamic system, real-time exergy storage amounts of different devices are obtained, wherein the physical property query of the water working medium can be loaded to the second processing unit $f_2(x)$ through the embedded data table or the fitting formula; in a process of "10", in a third processing unit $f_3(x)$, according to the real-time exergy storage amounts of the different devices, the exergy storage variation of each thermodynamic subsystem before and after acting of the thermodynamic system regulation schemes is calculated, and then is converted to the maximum power output of the various thermodynamic system regulation schemes, and the results thereof are transmitted to the comparison selector; in a process of "11", the maximum power regulation quantity signal obtained in the process of "6" and the maximum power output of the various regulation schemes obtained in the process of "10" are selected and judged in the comparison selector, then the optimal primary frequency regulation control scheme signal suitable for the current operation state is generated and transmitted to the valve actuation unit, and the selected primary frequency regulation control scheme signal is converted to the valve control signal of the corresponding scheme.

Figure 2:
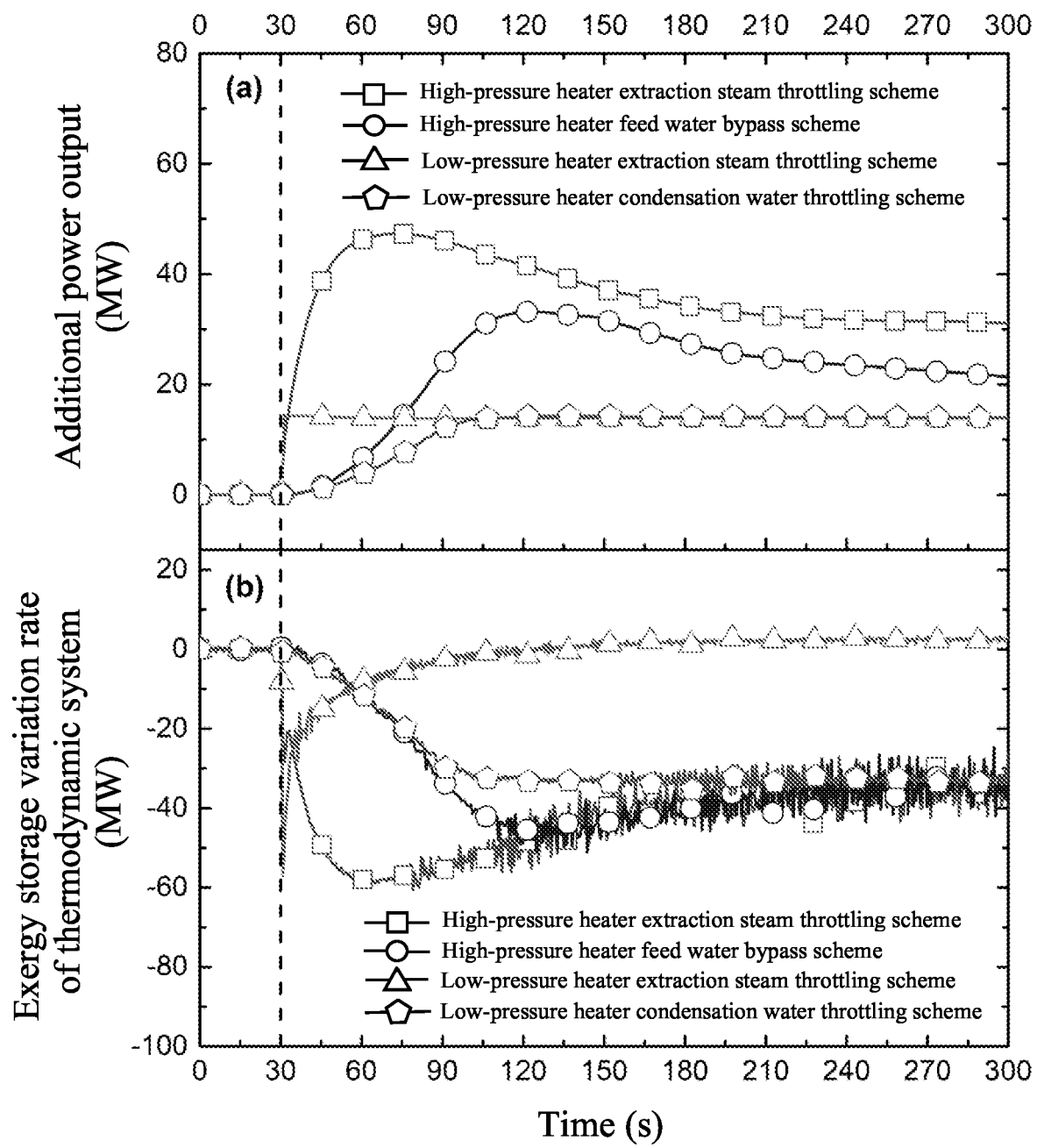
FIG. 2 shows changing curves of an additional power output and an exergy storage variation rate of the four thermodynamic system regulation schemes involved in the primary frequency regulation according to the present invention.

FIG. 2 shows changing curves of an additional power output and an exergy storage variation rate during regulation processes of the four thermodynamic system regulation schemes. At the $30^{th}$ second, the four regulation schemes start to take action. It can be seen from FIG. 2 that: the decrease quantity of the energy storage variation rate keeps consistent with the increase quantity of the additional power output in real-time, and the data change has a one-to-one correspondence, which is the theoretical basis of the realization of the present invention.

What is claimed is:

1. An optimized control method for a primary frequency regulation based on an exergy storage correction of a thermodynamic system of a coal-fired unit, which determines an optimal primary frequency regulation control scheme suitable for a current state according to an exergy storage amount of each thermodynamic device of the thermodynamic system of the coal-fired unit during different transient processes, and corrects a primary frequency regulation control logic, comprising steps of:

(1) acquiring a real-time exergy storage amount of each thermodynamic device of the thermodynamic system of the coal-fired unit, particularly comprising steps of:
through pressure sensors, acquiring pressures of working fluids of each thermodynamic device of the thermodynamic system of the coal-fired unit; through temperature sensors, acquiring temperatures of the working fluids and metal heating surfaces of each thermodynamic device of the thermodynamic system of the coal-fired unit; looking up a calculation table of water and steam properties, and calculating the exergy storage amount of each thermodynamic device in arbitrary states, comprising exergy storage amounts of the working fluids and the metal heating surfaces; wherein: for an $i^{th}$ thermodynamic device, an exergy storage amount is calculated through formulas of:

$$Ex_{s,i} = M_s \cdot [u(P_{s,i}, T_{s,i}) - u_0 - T_0 \cdot (s(P_{s,i}, T_{s,i}) - s_0)];$$

$$Ex_{m,i} = M_m \cdot C_m [T_{m,i} - T_0 - T_0 \cdot \ln(T_{m,i}/T_0)];$$

$$Ex_{w,i} = M_w \cdot [u(P_{w,i}, T_{w,i}) - u_0 - T_0 \cdot (s(P_{w,i}, T_{w,i}) - s_0)];$$

$$Ex_i = Ex_{s,i} + Ex_{m,i} + Ex_{w,i};$$

in the formulas: $Ex_{s,i}$, $Ex_{m,i}$ and $Ex_{w,i}$ are respectively exergy storage amounts of steam, metal heating surfaces and feed water of the $i^{th}$ thermodynamic device, in unit of kJ; $M_s$, $M_m$ and $M_w$ are respectively mass of steam, metal heating surfaces and feed water of the $i^{th}$ thermodynamic device, in unit of kg; $T_0$ is an ambient temperature, in unit of K; $u_0$ is a corresponding internal energy under the ambient temperature and an ambient pressure, in unit of kJ/kg; $s_0$ is a corresponding entropy under the ambient temperature and the ambient pressure, in unit of kJ/(kg·K); $u(P_{s,i}, T_{s,i})$ is an internal energy of steam, which is calculated through a steam pressure $P_{s,i}$ and a steam temperature $T_{s,i}$, in unit of kJ/kg; $s(P_{s,i}, T_{s,i})$ is an entropy of steam, which is calculated through the steam pressure $P_{s,i}$ and the steam temperature $T_{s,i}$, in unit of kJ/(kg·K); $C_m$ is a specific heat capacity of metal heating surfaces of a heater, in unit of kJ/(kg·K), $T_{m,i}$ is an average temperature of the metal heating surfaces of the heater, in unit of K; $u(P_{w,i}, T_{w,i})$ is an internal energy of feed water, which is calculated through a feed water pressure $P_{w,i}$ and a feed water temperature $T_{w,i}$, in unit of kJ/kg; $s(P_{w,i}, T_{w,i})$ is an entropy of feed water, which is calculated through the feed water pressure $P_{w,i}$ and the feed water temperature $T_{w,i}$ in unit of kJ/(kg·K);

(2) acquiring a maximum power output of various regulation schemes of the thermodynamic system of the coal-fired unit, wherein: the various regulation schemes of the thermodynamic system of the coal-fired unit for the primary frequency regulation comprises a high-pressure heater extraction steam throttling scheme, a high-pressure heater feed water bypass scheme, a low-pressure heater extraction steam throttling scheme and a low-pressure heater condensation water throttling scheme; during a transient operation process, an exergy storage amount of each regulation scheme involved in the primary frequency regulation in an initial state is a total energy storage amount of all thermodynamic devices of a corresponding subsystem;

in the initial state, a total exergy storage amount $Ex_{j,a}$ of a subsystem corresponding to a $j^{th}$ thermodynamic system regulation scheme is $$Ex_{j,a} = \sum_{i=1}^{N} Ex_{j,i,a},$$

wherein j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $$Ex_{j,a} = \sum_{i=1}^{N} Ex_{j,i,a}, Ex_{j,i,a}$$

is an exergy storage amount of an $i^{th}$ thermodynamic device of the subsystem corresponding to the $j^{th}$ thermodynamic system regulation scheme, in unit of kJ; N is a total number of all thermodynamic devices included in the subsystem corresponding to the $j^{th}$ thermodynamic system regulation scheme;

in the different thermodynamic system regulation schemes, temperature values and pressure values of each thermodynamic device at the end of the primary frequency regulation are obtained according to principles as follows;

for the high-pressure heater extraction steam throttling scheme, namely j=1, at the end of the primary frequency regulation, inside each high-pressure heater, a steam pressure is a drain pressure at an inlet of a deaerator, a steam temperature is a temperature of saturated steam corresponding to the drain pressure at the inlet of the deaerator, a feed water temperature is a temperature at an outlet of a feed water pump, a feed water pressure is a pressure at the outlet of the feed water pump, and a temperature of the metal heating surfaces is same to the steam temperature;

for the high-pressure heater feed water bypass scheme, namely j=2, at the end of the primary frequency regulation, inside each high-pressure heater, a steam pressure is a pressure at a corresponding extraction steam outlet, a steam temperature is a temperature of saturated steam corresponding to the pressure at the corresponding extraction steam outlet, a feed water temperature is a temperature at an outlet of a feed water pump, a feed water pressure is a pressure at the outlet of the feed water pump, and a temperature of the metal heating surfaces is same to the steam temperature;

for the low-pressure heater extraction steam throttling scheme, namely j=3, at the end of the primary frequency regulation, inside each low-pressure heater, a steam pressure is a drain pressure at an inlet of a condenser, a steam temperature is a temperature of saturated steam corresponding to the drain pressure at the inlet of the condenser, a temperature of condensation water is a temperature at an outlet of a condensation water pump, a pressure of condensation water is a pressure at the outlet of the condensation water pump, and a temperature of the metal heating surfaces is same to the steam temperature;

for the low-pressure heater condensation water throttling scheme, namely j=4, at the end of the primary frequency regulation, inside each low-pressure heater, a steam pressure is a pressure at a corresponding extraction steam outlet, a steam temperature is a temperature of saturated steam corresponding to the pressure at the corresponding extraction steam outlet, a temperature of condensation water is a temperature at an outlet of a condensation water pump, a pressure of condensation water is a pressure at the outlet of the condensation water pump, and a temperature of the metal heating surfaces is same to the steam temperature;

thereafter, an obtained total exergy storage amount $Ex_{j,b}$ of the corresponding subsystem after acting of the $j^{th}$ thermodynamic system regulation scheme is $$Ex_{j,b} = \sum_{i=1}^{N} Ex_{j,i,b},$$

wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $$Ex_{j,b} = \sum_{i=1}^{N} Ex_{j,i,b}, Ex_{j,i,b}$$

is an exergy storage amount of the $i^{th}$ thermodynamic device of the subsystem corresponding to the $j^{th}$ thermodynamic system regulation scheme in an end state, in unit of kJ; N is the total number of all the thermodynamic devices included in the subsystem corresponding to the $j^{th}$ thermodynamic system regulation scheme;

therefore, an exergy storage variation $\Delta Ex_j$ under acting of the $j^{th}$ thermodynamic system regulation scheme is $\Delta Ex_j = |Ex_{j,a} - Ex_{j,b}|$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

an average exergy storage variation rate $\Delta \dot{E}x_j$ under acting of the $j^{th}$ thermodynamic system regulation scheme is $\Delta \dot{E}x_j = \Delta Ex_j/T_j$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $\Delta \dot{E}x_j=\Delta Ex_j/T_j$, $T_j$ is time required by the primary frequency regulation; and according to grid assessment requirements, $T_j$ takes 60 seconds;

a one-to-one correspondence exists between the average exergy storage variation rate and the maximum power output of the $j^{th}$ thermodynamic system regulation scheme that:

$\Delta P_j=\Delta \dot{E}x_j \cdot \eta_j$, wherein: j=1, 2, 3 and 4, respectively corresponding to the high-pressure heater extraction steam throttling scheme, the high-pressure heater feed water bypass scheme, the low-pressure heater extraction steam throttling scheme and the low-pressure heater condensation water throttling scheme;

in the formula of $\Delta P_j=\Delta \dot{E}x_j \cdot \eta_j$, $\Delta P_j$ is the maximum power output of the $j^{th}$ thermodynamic system regulation scheme, in unit of kW; $\Delta \dot{E}x_j$ is the average exergy storage variation rate under acting of the $j^{th}$ thermodynamic system regulation scheme, in unit of kW; $\eta_j$ is an exergy storage conversion efficiency of the $j^{th}$ thermodynamic system regulation scheme;

(3) generating an optimal primary frequency regulation control scheme suitable for a current operation state, particularly comprising steps of:

according to a grid frequency deviation $\Delta f$ of the current state and a current speed droop $\delta$ of the coal-fired unit, acquiring a maximum power regulation quantity $\Delta P$ required by a current frequency regulation through a formula of:

$\Delta P = f_1(\Delta f) = \Delta f/\delta$;

comparing the maximum power output $\Delta P_j$ under acting of the four regulation schemes with the maximum power regulation quantity $\Delta P$ required by the current frequency regulation, and judging whether it meets a condition of:

$\Delta P_j \geq \Delta P$, wherein $j$ is selected from 1,2,3 and 4;

in the regulation schemes meeting the condition of $\Delta P_j \geq \Delta P$, generating the optimal primary frequency regulation control scheme k suitable for the current state, wherein a corresponding exergy storage conversion efficiency $\eta_k$ should take a maximum value of the exergy storage conversion efficiencies of the four thermodynamic system regulation schemes; that is to say $\eta_k$ meets a condition of:

$\eta_k = \max\{\eta_1, \eta_2, \eta_3, \eta_4\}$;

(4) generating a primary frequency regulation control logic corresponding to the optimal primary frequency regulation control scheme, particularly comprising steps of:

putting the determined optimal primary frequency regulation control scheme into a current primary frequency regulation control logic, wherein: the high-pressure heater extraction steam throttling scheme is to make an extraction steam pipe valve of each high-pressure heater involved in the primary frequency regulation control; the high-pressure heater feed water bypass scheme is to make a bypass pipe valve of each high-pressure heater involved in the primary frequency regulation control; the low-pressure heater extraction steam throttling scheme is to make an extraction steam pipe valve of each low-pressure heater involved in the primary frequency regulation control; and the low-pressure heater condensation water throttling scheme is to make a pipe valve of each low-pressure heater involved in the primary frequency regulation control;

then, superimposing a regulation output $\Delta \mu_{PID}$ obtained by a frequency difference of the primary frequency regulation in a PID (Proportion Integration Differentiation) controller to a corresponding control valve of the optimal scheme, and generating a new opening degree $\mu_{new}$ of the valve through a formula of:

$\mu_{new} = \mu_{old} + \Delta \mu_{PID}$, wherein: in the formula, $\mu_{old}$ is a corresponding valve opening degree in the initial state;

finally, forming a closed-loop optimized control logic for putting the optimal primary frequency regulation control scheme into the primary frequency regulation.

2. The optimized control method for the primary frequency regulation based on the exergy storage correction of the thermodynamic system of the coal-fired unit, as recited in claim 1, wherein: in the four thermodynamic system regulation schemes, the high-pressure heater extraction steam throttling scheme and the high-pressure heater feed water bypass scheme utilize an exergy storage of a high-pressure heater subsystem in the primary frequency regulation, wherein the high-pressure heater subsystem comprises all of high-pressure heaters, high-pressure cylinders, medium-pressure cylinders and connection pipes; the low-pressure heater extraction steam throttling scheme and the low-pressure heater condensation water throttling scheme utilize an exergy storage of a low-pressure heater subsystem in the primary frequency regulation, wherein the low-pressure heater subsystem comprises all of low-pressure heaters, low-pressure cylinders, deaerators and connection pipes.

3. The optimized control method for the primary frequency regulation based on the exergy storage correction of the thermodynamic system of the coal-fired unit, as recited in claim 2, wherein: in the high-pressure heater extraction steam throttling scheme and the low-pressure heater extraction steam throttling scheme, an electric control valve is adopted for each extraction steam pipe; in the high-pressure heater feed water bypass scheme and the low-pressure heater condensation water throttling scheme, a pneumatic control valve is adopted for each heater pipe.

4. The optimized control method for the primary frequency regulation based on the exergy storage correction of the thermodynamic system of the coal-fired unit, as recited in claim 1, wherein: values of the exergy storage conversion efficiencies $\eta_j$ of the high-pressure heater extraction steam throttling scheme, the high-pressure heater feed water bypass scheme, the low-pressure heater extraction steam throttling scheme and the low-pressure heater condensation water throttling scheme are respectively 72%~76% 43%~55%, 81%~89%, and 23~28%.

5. The optimized control method for the primary frequency regulation based on the exergy storage correction of the thermodynamic system of the coal-fired unit; as recited in claim 1; wherein: the speed droop $\delta$ suitable for the various thermodynamic system regulation schemes is 1%-4%.

* * * * *